United States Patent
Wen

(10) Patent No.: US 12,195,599 B2
(45) Date of Patent: Jan. 14, 2025

(54) GLASS FIBER FILLED FLAME RETARDANT PROPYLENE COMPOSITION

(71) Applicant: SABIC GLOBAL TECHNOLOGIES B.V., Bergen op Zoom (NL)

(72) Inventor: Liang Wen, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 926 days.

(21) Appl. No.: 17/274,233

(22) PCT Filed: Sep. 24, 2019

(86) PCT No.: PCT/EP2019/075739
§ 371 (c)(1),
(2) Date: Mar. 8, 2021

(87) PCT Pub. No.: WO2020/064752
PCT Pub. Date: Apr. 2, 2020

(65) Prior Publication Data
US 2021/0355287 A1   Nov. 18, 2021

(30) Foreign Application Priority Data
Sep. 25, 2018  (EP) .................................. 18196581

(51) Int. Cl.
| | | |
|---|---|---|
| C08J 5/04 | (2006.01) | |
| C08J 3/00 | (2006.01) | |
| C08K 3/22 | (2006.01) | |
| C08K 5/52 | (2006.01) | |
| C08K 5/523 | (2006.01) | |
| C08K 7/14 | (2006.01) | |
| C08L 23/08 | (2006.01) | |
| C08L 23/12 | (2006.01) | |
| C08L 23/14 | (2006.01) | |
| C08L 23/16 | (2006.01) | |

(52) U.S. Cl.
CPC ............... *C08J 5/043* (2013.01); *C08J 3/005* (2013.01); *C08K 3/22* (2013.01); *C08K 5/5205* (2013.01); *C08K 5/523* (2013.01); *C08K 7/14* (2013.01); *C08L 23/0815* (2013.01); *C08L 23/12* (2013.01); *C08L 23/142* (2013.01); *C08L 23/16* (2013.01); C08K 2003/2296 (2013.01); C08K 2201/005 (2013.01); C08L 2201/02 (2013.01); C08L 2205/025 (2013.01); C08L 2205/03 (2013.01); C08L 2205/22 (2013.01); C08L 2207/02 (2013.01)

(58) Field of Classification Search
CPC ............. C08J 5/043; C08K 2003/2296; C08K 2003/323; C08K 3/016; C08K 3/32; C08K 5/0066; C08K 5/205; C08K 5/523; C08K 7/14; C08K 5/5205; C08L 2201/02; C08L 2205/025; C08L 2205/22; C08L 2207/02; C09K 21/12
See application file for complete search history.

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | |
| 2017/0226327 A1* | 8/2017 | Kabeya | C08K 7/02 |
| 2019/0264002 A1* | 8/2019 | Wen | C09K 21/12 |

FOREIGN PATENT DOCUMENTS

| | | | |
|---|---|---|---|
| EP | 3202841 A1 | | 8/2017 |
| EP | 3255095 A1 | | 12/2017 |
| JP | 2022110805 A | * | 7/2022 |
| KR | 20150067863 A | * | 6/2015 |
| WO | 2006010414 A1 | | 2/2006 |
| WO | 2018019762 A1 | | 2/2018 |

OTHER PUBLICATIONS

KR-20150067863-A (Jun. 19, 2015) machine translation.*
JP-2022110805-A (Jul. 29, 2022) machine translation.*
International Search Report for International Application No. PCT/EP2019/075739, International Filing Date Sep. 24, 2019, Date of Mailing Oct. 29, 2019, 5 pages.
Written Opinion for International Application No. PCT/EP2019/075739, International Filing Date Sep. 24, 2019, Date of Mailing Oct. 29, 2019, 6 pages.

* cited by examiner

*Primary Examiner* — Ana L. Woodward
(74) *Attorney, Agent, or Firm* — CANTOR COLBURN LLP

(57) ABSTRACT

The invention relates to a glass fiber filled flame retardant polypropylene composition comprising (A) a polypropylene-based polymer, (B) a first flame retardant in an amount of 15 to 40 wt % of the total composition, wherein the first flame retardant is in the form of particles comprising ammonium polyphosphate and at least one phosphate selected from the group consisting of melamine phosphate, melamine polyphosphate, melamine pyrophosphate, piperazine phosphate, piperazine polyphosphate, piperazine pyrophosphate, 2-methylpiperazine monophosphate, tricresyl phosphate, alkyl phosphates, haloalkyl phosphates, tetraphenyl pyrophosphate, poly(2-hydroxy propylene spirocyclic pentaerythritol bisphosphate) and poly(2,2-dimethylpropylene spirocyclic pentaerythritol bishosphonate), (C) a second flame retardant in an amount of 0.1 to 15 wt % of the total composition, wherein the second flame retardant comprises an aromatic phosphate ester and (D) glass fibers in an amount of 5 to 40 wt % of the total composition.

12 Claims, No Drawings

GLASS FIBER FILLED FLAME RETARDANT PROPYLENE COMPOSITION

CROSS REFERENCE TO RELATED APPLICATIONS

This application is a National Stage application of PCT/EP2019/075739, filed Sep. 24, 2019, which claims the benefit of European Application No. 18196581.5, filed Sep. 25, 2018, both of which are incorporated by reference in their entirety herein.

The invention relates to a glass fiber filled flame retardant composition comprising a propylene-based polymer and glass fibers, to a process for obtaining such composition, to the use of such composition and an article comprising such composition.

Glass fiber filled polypropylene compositions are commonly used in automotive applications. For use in these applications, high flame retardancy is required. In many cases, it is required to meet the UL94 standard.

In order to improve the flame retardancy performance of polypropylene (PP), a flame retardant (FR) is usually added to the PP. One group of currently used flame retardants is brominated flame retardants. It has been suggested that highly toxic brominated dibenzodioxines and dibenzofurans may be formed during burning of some of the currently used brominated flame retardants. Therefore, more and more applications require non-bromine FR solutions. Nowadays, intumescent flame retardant (IFR) is widely used.

EP3255095 discloses a flame-retardant polyolef in resin composition comprising polypropylene, melamine pyrophosphate, piperazine pyrophosphate, glass fiber and zinc oxide.

EP3202841 discloses a flame-retardant polypropylene resin composition comprising a polypropylene resin, glass fiber, phosphorous-containing flame retardant (FP2200 from Adeka), antioxidant, neutralizing agent and a surfactant.

WO2018/019762A1 discloses a flame retardant polypropylene composition comprising
(A) a polypropylene-based polymer,
(B) a first flame retardant in an amount of 15 to 40 wt % of the total composition, wherein the first flame retardant is in the form of particles comprising ammonium polyphosphate and at least one phosphate selected from the group consisting of
melamine phosphate,
melamine polyphosphate,
melamine pyrophosphate,
piperazine phosphate,
piperazine polyphosphate,
piperazine pyrophosphate,
2-methylpiperazine monophosphate,
tricresyl phosphate,
alkyl phosphates,
haloalkyl phosphates,
tetraphenyl pyrophosphate,
poly(2-hydroxy propylene spirocyclic pentaerythritol bisphosphate) and
poly(2,2-dimethylpropylene spirocyclic pentaerythritol bisphosphonate) and
(C) a second flame retardant in an amount of 0.1 to 15 wt % of the total composition, wherein the second flame retardant comprises an aromatic phosphate ester.

There is still a demand in the art for a flame retardant glass fiber filled propylene composition which has good flame retardant properties and mechanical properties.

Furthermore, it is desired that the flame retardant glass fiber filled propylene composition has a good flow while at the same time having good flame retardant properties and mechanical properties.

It is an objective of the present invention to provide a glass fiber filled flame retardant propylene composition in which the above-described and/or other needs are met.

Accordingly, the present invention provides a glass fiber filled flame retardant polypropylene composition comprising
(A) a polypropylene-based polymer,
(B) a first flame retardant in an amount of 15 to 40 wt % of the total composition, wherein the first flame retardant is in the form of particles comprising ammonium polyphosphate and at least one phosphate selected from the group consisting of
melamine phosphate,
melamine polyphosphate,
melamine pyrophosphate,
piperazine phosphate,
piperazine polyphosphate,
piperazine pyrophosphate,
2-methylpiperazine monophosphate,
tricresyl phosphate,
alkyl phosphates,
haloalkyl phosphates,
tetraphenyl pyrophosphate,
poly(2-hydroxy propylene spirocyclic pentaerythritol bisphosphate) and
poly(2,2-dimethylpropylene spirocyclic pentaerythritol bisphosphonate) and
(C) a second flame retardant in an amount of 0.1 to 15 wt % of the total composition,
wherein the second flame retardant comprises an aromatic phosphate ester and
(D) glass fibers in an amount of 5 to 40 wt % of the total composition.

The flame retardants present in the polypropylene composition according to the invention consists of the first flame retardant and the second flame retardant. It was surprisingly found that the use of the specific combination of the flame retardants in a glass fiber filled propylene composition leads to a particularly good flame retardancy and good mechanical properties, while at the same time the composition has a good flow. Surprisingly, the presence of the glass fibers led to lower amounts of flame retardants being required for obtaining a good flame retardancy.

(A) Polypropylene-Based Polymer

Preferably, the amount of (A) is 50 to 90 wt %, for example 55 to 85 wt % or 60 to 80 wt %, with respect to the total composition.

Homopolymer and Non-Heterophasic Copolymer

The polypropylene-based polymer may comprise or may be a propylene homopolymer or a propylene copolymer including random copolymers and (multi)block copolymers. The copolymer is preferably a random copolymer. The copolymer may consist of at least 70 wt % of propylene monomer units and up to 30 wt % of ethylene and/or α-olefin monomer units, based on the total weight of the copolymer. Preferably, the α-olefin is selected from the group of α-olefins having 4-10 carbon atoms, for example 1-butene, 1-pentene, 4-methyl-1-pentene, 1-hexene, 1-heptene or 1-octene. The propylene copolymer is preferably a propylene-ethylene copolymer.

The amount of ethylene and/or α-olefin monomer units in the propylene copolymer is preferably 1-15 wt %, more preferably 1-10 wt %, more preferably 1-6 wt %, more preferably 1-4 wt % based on the total weight of the propylene copolymer.

When the polypropylene-based polymer comprises a propylene α-olefin copolymer, the propylene copolymer is preferably a propylene-ethylene random copolymer wherein the amount of ethylene monomer units is 1-15 wt %, more preferably 1-10 wt %, more preferably 1-6 wt %, more preferably 1-4 wt % based on the total weight of the propylene copolymer.

The MFI of some preferred propylene homopolymer or propylene copolymer may be for example at least 10 dg/min, at least 20 dg/min, at least 30 dg/min or at least 40 dg/min and/or at most 100 dg/min, at most 80 dg/min, at most 60 dg/min or at most 50 dg/min, measured according to ISO1133-1:2011 (2.16 kg/230° C.).

Heterophasic Propylene Copolymer

The polypropylene-based polymer may comprise or may be a heterophasic propylene copolymer. Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers which may be employed in the present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer may be prepared by a process comprising
  polymerizing propylene and optionally ethylene and/or α-olefin in the presence of a catalyst system to obtain the propylene-based matrix and
  subsequently polymerizing ethylene and α-olefin in the propylene-based matrix in the presence of a catalyst system to obtain the dispersed ethylene-α olefin copolymer.

These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based polymer may be one type of heterophasic propylene copolymer or a mixture of different types of heterophasic propylene copolymers, e.g. a mixture of a first type of a heterophasic propylene copolymer and a second type of heterophasic propylene copolymer at any weight ratio, e.g. 1:99-99:1 or 50:50.

The heterophasic propylene copolymer consists of
  (a) a propylene-based matrix,
    wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
    wherein the propylene-based matrix is present in an amount of 60 to 95 wt % based on the total heterophasic propylene copolymer and
  (b) a dispersed ethylene-α-olefin copolymer,
    wherein the dispersed ethylene-α-olefin copolymer is present in an amount of 40 to 5 wt % based on the total heterophasic propylene copolymer and
    wherein the sum of the total amount of propylene-based matrix and total amount of the dispersed ethylene-α-olefin copolymer in the heterophasic propylene copolymer is 100 wt % with respect to the heterophasic propylene copolymer.

The propylene-based matrix consists of a propylene homopolymer and/or a propylene-copolymer consisting of at least 70 wt % of propylene monomer units and up to 30 wt % of ethylene and/or α-olefin monomer units, for example consisting of at least 80 wt % of propylene monomer units and up to 20 wt % of ethylene and/or α-olefin monomer units, for example consisting of at least 90 wt % of propylene monomer units and up to 10 wt % of ethylene and/or α-olefin monomer units, based on the total weight of the propylene-based matrix. Preferably, the α-olefin is selected from the group of α-olefins having 4 to 10 carbon atoms, for example 1-butene, 1-pentene, 4-methyl-1-pentene, 1-hexene, 1-heptene or 1-octene. The propylene copolymer is preferably a propylene-ethylene copolymer.

Preferably, the propylene-based matrix consists of a propylene homopolymer. When the propylene-based matrix consists of a propylene homopolymer, a higher stiffness is obtained compared to the case where the propylene-based matrix is a propylene copolymer as described above, which may be advantageous.

The melt flow index (MFI) of the propylene-based matrix (before the heterophasic propylene copolymer is mixed into the composition of the invention), $MFI_{PP}$, may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133 (2.16 kg/230° C.). The $MFI_{PP}$ may be in the range of for example 0.1 to 50 dg/min, for example from 0.2 to 40 dg/min, for example 0.3 to 30 dg/min, for example 0.5 to 25 dg/min, for example from 1 to 20 dg/min, for example from 1.5 to 10 dg/min, measured according to ISO1133 (2.16 kg/230° C.).

The propylene-based matrix is present in an amount of 60 to 95 wt %. Preferably, the propylene-based matrix is present in an amount of 60 to 80 wt %, for example at least 65 wt % or at least 70 wt % and/or at most 78 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

In some preferred heterophasic propylene copolymers, the amount of ethylene monomer units in the ethylene-α-olefin copolymer is in the range of 20 to 65 wt %, for example at least 30 wt %, at least 35 wt %, at least 40 wt % or at least 45 wt %, and/or at most 60 wt % or at most 55 wt %, based on the total weight of the ethylene-α-olefin copolymer. The amount of ethylene in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexene, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), $MFI_{EPR}$, may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min or at most 3 dg/min. The $MFI_{EPR}$ may be in the range for example from 0.001 to 30 dg/min, for example from 0.01 to 20 dg/min, for example 0.1 to 15 dg/min, for example 0.3 to 10 dg/min, for example from 0.7 to 5 dg/min, for example from 1 to 3 dg/min. $MFI_{EPR}$ is calculated taking into account the MFI of the propylene-based matrix ($MFI_{PP}$) measured according to ISO1133 (2.16 kg/230° C.), the MFI of the heterophasic propylene copolymer (MFIheterophasic) measured according to ISO1133 (2.16 kg/230° C.) and the amount of the propylene-based matrix in the heterophasic propylene copolymer (matrix content) and the amount of the dispersed phase in the heterophasic propylene copolymer (rubber content (RC)) according to the following formula:

$$MFIEPR = 10^{\wedge}\left(\frac{\text{Log } MFIheterophasic - \text{matrix content} * \text{Log } MFIPP}{\text{rubber content}}\right)$$

The dispersed ethylene-α-olefin copolymer is present in an amount of 40 to 5 wt % based on the total heterophasic propylene copolymer. In some preferred heterophasic propylene copolymers, the dispersed ethylene-α-olefin copolymer is present in an amount of at least 10 wt %, for example at least 15 wt % or at least 17 wt %, and/or at most 35 wt %, for example at most 30 wt % or 25 wt %, based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % with respect to the heterophasic propylene copolymer.

Preferably, the heterophasic propylene copolymer has a fraction soluble in p-xylene at 25° C. (CXS) measured according to ISO 16152:2005 of 40 to 5 wt %. In some preferred heterophasic propylene copolymers, the heterophasic propylene copolymer has CXS of at least 10 wt %, for example at least 15 wt % or at least 17 wt %, and/or at most 35 wt %, for example at most 30 wt % or 25 wt %. In some preferred heterophasic propylene copolymers, the heterophasic propylene copolymer has CXS of 10 to 25 wt %. In some preferred heterophasic propylene copolymers, the heterophasic propylene copolymer has CXS of 25 to 40 wt %.

Preferably, the amount of ethylene monomer units in the heterophasic propylene copolymer (sometimes referred as TC2) is in the range of 3-20 wt % based on the heterophasic propylene copolymer. For example, the amount of ethylene monomer units in the heterophasic propylene copolymer may be at least 5 wt % or at least 7 wt % and/or at most 15 wt % or at most 13 wt %, based on the heterophasic propylene copolymer.

The MFI of some preferred heterophasic propylene copolymers may be for example at least 10 dg/min or at least 15 dg/min and/or at most 50 dg/min or at most 40 dg/min, measured according to ISO1133 (2.16 kg/230° C.). The MFI of some preferred heterophasic propylene copolymers may be for example at least 0.1 dg/min, at least 0.2 dg/min, at least 0.3 dg/min, at least 0.5 dg/min, at least 1 dg/min at least 1.5 dg/min, and/or for example at most 8 dg/min or at most 5 dg/min, measured according to ISO1133 (2.16 kg/230° C.).

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with other components to obtain the composition according to the invention. The value of the WI of the heterophasic propylene copolymer (MFIheterophasic) refers to the final MFI of the heterophasic propylene copolymer. To exemplify this:

In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

Preferably, in the heterophasic propylene copolymer according to the invention, the propylene copolymer of the matrix consists of propylene monomer units and ethylene and/or α-olefin monomer units wherein the α-olefin is selected from the group of α-olefins having 2 or 4 to 10 carbon atoms and the dispersed ethylene-α-olefin copolymer consists of ethylene and α-olefin selected from the group of α-olefins having 3 to 8 carbon atoms.

The propylene-based polymer may also be a combination of any of the propylene-based polymer mentioned above, e.g. a mixture of a propylene homopolymer and a heterophasic propylene copolymer at a weight ratio of 1:99-99:1 or 50:50 or a mixture of a propylene homopolymer and a random propylene-ethylene copolymer at a weight ratio of 1:99-99:1 or 50:50.

In some preferred embodiments, the propylene-based polymer is a mixture of a propylene homopolymer and a heterophasic propylene copolymer at a weight ratio of 30:70 to 7:30, wherein the heterophasic propylene copolymer has MFI of 10 to 50 dg/min measured according to ISO1133-1:2011 (2.16 kg/230° C.), wherein the amount of the dispersed ethylene-α-olefin copolymer in the heterophasic propylene copolymer is 5 to 20 wt % and the amount of ethylene in the heterophasic propylene copolymer is 3 to 13 wt %, with respect to the heterophasic propylene copolymer.

In some preferred embodiments, the propylene-based polymer is a mixture of a propylene homopolymer and a heterophasic propylene copolymer at a weight ratio of 30:70 to 7:30, wherein the heterophasic propylene copolymer has MFI of 10 to 50 dg/min measured according to ISO1133-1:2011 (2.16 kg/230° C.), wherein the amount of the dispersed ethylene-α-olefin copolymer in the heterophasic propylene copolymer is 20 to 40 wt % and the amount of ethylene in the heterophasic propylene copolymer is 13 to 20 wt %, with respect to the heterophasic propylene copolymer.

(B) Solid Phase Phosphate Flame Retardant

The first flame retardant is in the form of particles comprising ammonium polyphosphate and at least one phosphate selected from the group consisting of
melamine phosphate,
melamine polyphosphate,
melamine pyrophosphate,
piperazine phosphate,
piperazine polyphosphate,
piperazine pyrophosphate,
2-methylpiperazine monophosphate,
tricresyl phosphate,
alkyl phosphates,
haloalkyl phosphates,
tetraphenyl pyrophosphate,
poly(2-hydroxy propylene spirocyclic pentaerythritol bisphosphate),
poly(2,2-dimethylpropylene spirocyclic pentaerythritol bisphosphonate).

The amount of the first flame retardant is 15 to 40 wt %, for example at least 18 wt % or at least 20 wt % and/or for example at most 35 wt %, at most 30 wt % or at most 25 wt %, with respect to the total composition.

Preferably, the first flame retardant has a normal particle size distribution (D50) of at least 8 microns as determined by Mastersizer 2000 available from Malvern.

Preferably, the amount of phosphate in the first flame retardant is 40-75 wt % as measured after treating with nitric acid using ICP-OES spectrometer (iCAP 6300 Duo available from Thermo Fisher)

Preferably, the first flame retardant comprises melamine phosphate.

Preferably, the first flame retardant further comprises zinc oxide.

Preferably, the amount of the ammonium polyphosphate in the first flame retardant is 5-15 wt %.

Preferably, the amount of the ammonium polyphosphate in the first flame retardant is 5-15 wt %,
the amount of melamine phosphate in the first flame retardant is 50-80 wt %,
the amount of piperazine phosphate in the first flame retardant is 10-25 wt % and
the amount of zinc oxide in the first flame retardant is 1-10 wt %.

(C) Phosphate Ester Flame Retardant

The amount of the aromatic phosphate ester flame retardant is 0.1 to 15 wt %, for example at least 0.5 wt %, at least 1.0 wt % or at least 2.0 wt % and/or for example at most 10 wt % or at most 5.0 wt %, with respect to the total flame retardant composition.

Preferably, the aromatic phosphate ester is selected from the group consisting of resorcinol bis(diphenyl phosphate);
tetraphenyl resorcinol bis(diphenylphosphate);
bisphenol A bis(diphenyl phosphate);
bisphenol A diphosphate;
resorcinol bis(di-2,6-xylyl phosphate),
phosphoric acid, mixed esters with [1,1'-biphenyl]-4-4'-diol and phenol;
phosphorictrichloride, polymer with 1,3-benzenediol, phenylester;
1,3-phenylene-tetrakis(2,6-dimethylphenyl)diphosphate;
isopropenylphenyl diphenyl phosphate;
4-phenylphenolformaldehyde phenylphosphonate;
tris(2,6-xylyl)phosphate;
resorcinol bis(di-2,6-xylyl phosphate);
bisphenol S bis(diphenyl phosphate);
resorcinol-bisphenol A phenyl phosphates.

Preferably, the aromatic phosphate ester is added as a liquid.

Preferably, the aromatic phosphate ester is bisphenol A bis(diphenyl phosphate).

(D) glass Fibers

The amount of the glass fibers is 5.0 to 40.0 wt %, preferably 10.0 to 30.0 wt %, with respect to the total composition according to the invention.

The glass fibers, as added to the composition, can comprise long and/or short glass fibers. Short glass fibers may have an average length of less than 4.0 mm before being added to the composition. After processing, the short glass fibers in the composition may have an average length of up to 1.0 mm. Long glass fibers may have an average length of at least 4.0 mm before being added to the composition. After processing, the long glass fibers in the composition may have an average length of 1.5 to 3.0 mm, for example 2.0 to 2.5 mm.

The diameter of the glass fibers can be 5.0 to 50.0 micrometers, specifically, 8.0 to 30.0 micrometers, more specifically, 10.0 to 20.0 micrometers.

The lengths and the diameters of the glass fibers can be determined based on the photo images by an image analysis software. The term "average" refers to an arithmetic average.

The glass fiber can be a coated glass fiber and can be prepared from continuous lengths of fibers by, for example, a sheathing or wire-coating process, by crosshead extrusion, or by a pultrusion technique. Using these technologies, fiber strands impregnated or coated with a polymer are formed. The fiber can then be cut into a desired length and can optionally be formed into pellets or granules. The fibers can be further processed, e.g. by injection moulding or extrusion processes, into a composition.

Suitable glass fibers can be obtained e.g. from Chongqing Polycomp International Corp and Nippon Electric Glass Co., Ltd.

(E) Adhesion Promotor

Preferably, the composition according to the invention comprises an adhesion promotor. An adhesion promoter may be applied to more easily and more uniformly disperse the fibres in the polymer matrix and to promote the adhesion between the fibres and the polypropylene composition. The adhesion promoter preferably comprises a modified (functionalised) polymer and optionally a low molecular weight compound having reactive polar groups. Modified α-olefin polymers, in particular propylene homopolymers and copolymers, like copolymers of ethylene and propylene with each other or with other α-olefins, are most preferred as they are highly compatible with the polymers in the composition of the invention. Modified polyethylene can be used as well. In terms of structure, the modified polymers are preferably selected from graft or block copolymers. Preference is further given to modified polymers containing groups deriving from polar compounds, in particular one or more selected from the group consisting of acid anhydrides, carboxylic acids, carboxylic acid derivatives, primary and secondary amines, hydroxyl compounds, oxazoline and epoxides, and also ionic compounds. Specific examples of such polar compounds are unsaturated cyclic anhydrides and their aliphatic diesters, and the diacid derivatives thereof. In particular, one can use maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

A preferred adhesion promoter is a maleic anhydride functionalised polypropylene, such as a propylene polymer grafted with maleic anhydride. A commercially available example for a suitable adhesion promoter is Exxelor® P01020 obtainable from ExxonMobil Chemical.

The adhesion promoter may have a melt flow index of from 1.0 to 500 g/10 min.

The amount of adhesion promoter depends on the amount of glass fibre and preferably ranges from 0.03 to 0.20 times the amount of glass fibre in the thermoplastic composition. Thus, when 10% by total weight of the polypropylene composition of glass fibres are used, the adhesive promoter will be preferably used in an amount of 0.3 to 2.0% by total weight of the thermoplastic composition. When 15% by total weight of the thermoplastic composition of glass fibres are used, the adhesive promoter will be preferably used in an amount of 0.45 to 3.0% by total weight of the thermoplastic composition.

(F) Other Optional Additives

The composition according to the invention may further comprise various additives. Examples of suitable additives include nucleating agents, stabilisers, e.g. heat stabilisers, anti-oxidants, UV stabilizers; colorants, like pigments and dyes; clarifiers; surface tension modifiers; lubricants; mould-release agents; flow improving agents; plasticizers; anti-static agents and blowing agents.

The skilled person can readily select any suitable combination of additives and additive amounts without undue experimentation. The amount of the additives may e.g. be from about 0.1 to about 10 wt %; from about 0.5 to about 5 wt % or of from 1.0 to about 3 wt % based on the total composition.

Composition

The sum of all components added in the process of the invention to form the composition comprising (A), (B), (C), (D) and the optional components (E) and (F) should add up to 100% by weight of the total composition.

Preferably, the total of components (A), (B), (C) and (D) is at least 90 wt %, at least 95 wt %, at least 97 wt %, at least 98 wt %, at least 99 wt %, at least 99.5 wt %, at least 99.9 wt % or 100 wt % of the total composition.

Process for Making Composition

The composition of the invention may be obtained by a process comprising melt-mixing (A), (B), (C), (D) and optionally (E) and/or (F) by using any suitable means. Accordingly, the invention further relates to a process for the preparation of the composition according to the invention comprising melt mixing (A), (B), (C), (D) and optionally (E) and/or (F). Preferably, the composition of the invention is made in a form that allows easy processing into a shaped article in a subsequent step, like in pellet or granular form. The composition can be a mixture of different particles or pellets; like a blend of the heterophasic propylene copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B), (C) (D) and/optionally (E) and/or (F) are mixed with (A) at a temperature that exceeds the melting point of (A). Melt-mixing may be done using techniques known to the skilled person, for example in an extruder. Generally, in the process of the invention, melt-mixing is performed at a temperature in the range from 170-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed is in the range from about 100 rpm to about 400 rpm.

Properties of Composition

MFI

The MFI of the composition according to the invention may be in the range of for example 5 to 50 dg/min, for example from 7 to 40 dg/min, for example 10 to 30 dg/min, for example 15 to 35 dg/min, measured according to ISO1133-1:2011 (2.16 kg/230° C.).

Flame Retardancy

Preferably, the composition according to the invention has a flame retardancy of V0 according to the UL94 test standard at a sample thickness of 3 mm, wherein the sample was conditioned at 23° C. and 50 percent relative humidity for 48 hours prior to testing.

Preferably, the composition according to the invention has a flame retardancy of V0 according to the UL94 test standard at a sample thickness of 3 mm, wherein the sample was conditioned at 70° C. for 168 hours prior to testing.

Preferably, the composition according to the invention has a flame retardancy of V1 or V0, preferably V0, according to the UL94 test standard at a sample thickness of 1.5 mm, wherein the sample was conditioned at 23° C. and 50 percent relative humidity for 48 hours prior to testing.

Preferably, the composition according to the invention has a flame retardancy of V1 or V0, preferably V0, according to the UL94 test standard at a sample thickness of 1.5 mm, wherein the sample was conditioned at 70° C. for 168 hours prior to testing.

Preferably, the composition according to the invention has a flame retardancy of V2, V1 or V0, preferably V1 or V0, more preferably V0, according to the UL94 test standard at a sample thickness of 0.8 mm, wherein the sample was conditioned at 23° C. and 50 percent relative humidity for 48 hours prior to testing.

Preferably, the composition according to the invention has a flame retardancy of V2, V1 or V0, preferably V1 or V0, more preferably V0, according to the UL94 test standard at a sample thickness of 0.8 mm, wherein the sample was conditioned at 70° C. for 168 hours prior to testing.

Charpy Impact Strength

Preferably, the composition according to the invention has a notched Charpy impact strength according to ISO 179-1: 2010 at 23° C. (test geometry: 80*10*4 mm) of at least 4.0 kJ/m$^2$, more preferably 6.0 kJ/m$^2$.

Stiffness (Flexural Modulus)

Preferably, the composition according to the invention has a flexural modulus according to ISO 178:2010 (parallel; test geometry: 80*10*4 mm thickness) of at least 3000 MPa.

Tensile Modulus

Preferably, the composition has a tensile modulus according to ISO527-1:2012 of at least 2000 N/m$^2$, more preferably at least 3000 N/m$^2$, more preferably at least 4000 N/m$^2$, more preferably at least 5000 N/m$^2$.

In some preferred embodiments, the propylene-based polymer is a propylene homopolymer having MFI of 10 to 50 dg/min measured according to ISO1133-1:2011 (2.16 kg/230° C.), wherein the composition according to the invention has a notched Charpy impact strength according to ISO 179-1:2010 at 23° C. (test geometry: 80*10*4 mm) of at least 4.0 kJ/m$^2$ and the composition according to the invention has a flexural modulus according to ISO 178:2010 (parallel; test geometry: 80*10*4 mm thickness) of at least 3000 MPa.

In some preferred embodiments, the propylene-based polymer is a mixture of a propylene homopolymer and a heterophasic propylene copolymer at a weight ratio of 30:70 to 7:30, wherein the heterophasic propylene copolymer has MFI of 10 to 50 dg/min measured according to ISO1133-1:2011 (2.16 kg/230° C.), wherein the amount of the dispersed ethylene-α-olefin copolymer in the heterophasic propylene copolymer is 5 to 20 wt % and the amount of ethylene in the heterophasic propylene copolymer is 3 to 13 wt %, with respect to the heterophasic propylene copolymer, wherein the composition has a notched Charpy impact strength according to ISO 179-1:2010 at 23° C. (test geometry: 80*10*4 mm) of at least 6.0 kJ/m$^2$ and the composition has a tensile modulus according to ISO527-1:2012 of at least 5000 N/m$^2$.

In some preferred embodiments, the propylene-based polymer is a mixture of of a propylene homopolymer and a heterophasic propylene copolymer at a weight ratio of 30:70 to 7:30, wherein the heterophasic propylene copolymer has MFI of 10 to 50 dg/min measured according to ISO1133-1:2011 (2.16 kg/230° C.), wherein the amount of the dispersed ethylene-α-olefin copolymer in the heterophasic propylene copolymer is 20 to 40 wt % and the amount of ethylene in the heterophasic propylene copolymer is 13 to 20 wt %, with respect to the heterophasic propylene copolymer, wherein the composition has a notched Charpy impact strength according to ISO 179-1:2010 at 23° C. (test geometry: 80*10*4 mm) of at least 4.0 kJ/m$^2$ and the composition has a tensile modulus according to ISO527-1:2012 of at least 2000 N/m$^2$.

Further Aspects

The composition according to the invention may be processed by any conventional technique known in the art into an article. Suitable examples of processing techniques wherein the composition according to the invention may be used include injection moulding, injection blow moulding, injection stretch blow moulding, rotational moulding, compression moulding, extrusion, extrusion compression moulding, extrusion blow moulding, sheet extrusion, film extrusion, cast film extrusion, foam extrusion, thermoforming and thin-walled injection moulding.

The invention further relates to an article comprising the composition according to the invention. In particular, the invention relates to an article comprising the composition according to the invention, wherein the article is made by one of the processing techniques mentioned above. Injection moulding is widely used to produce articles. Examples of particularly suitable articles made by the glass fiber filled composition according to the invention include enclosures of (miniature) circuit breakers and battery carriers and covers in electric cars. Other examples include caps and closures, batteries, pails, containers, external and internal parts in appliances, like printed circuit board holder, circuit breaker cover, drain pan in refrigerator, deflection coil of TV, stadium seats, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Preferably, the article according to the invention is enclosures of (miniature) circuit breakers, battery carriers and covers in electric cars, caps and closures, batteries, pails, containers, external and internal parts in appliances, like printed circuit board holder, circuit breaker cover, drain pan in refrigerator, deflection coil of TV, stadium seats, automotive exterior parts like bumpers, automotive interior parts like instrument panels, or automotive parts under the bonnet.

The invention further relates to the use of the article comprising the composition according to the invention for enclosures of (miniature) circuit breakers and battery carriers and covers in electric cars, caps and closures, batteries, pails, containers, automotive exterior parts like bumpers, automotive interior parts like instrument panels, or automotive parts under the bonnet.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Materials as shown in Table 1 were used in the experiments.

TABLE 1

| | Description |
|---|---|
| Polypropylene 1 | PP Homopolymer, MFI 47 g/10 min |
| Polypropylene 2 | heterophasic propylene copolymer comprising a matrix phase of a propylene homopolymer and a dispersed phase of propylene-ethylene copolymer having MFI of 30 g/10 min, Dispersed phase (RC): 19.1 wt %, Ethylene in dispersed phase (RCC2): 47.2 wt %, Ethylene in heterophasic propylene copolymer (T2): 9 wt % |
| Polypropylene 3 | heterophasic propylene copolymer comprising a matrix phase of a propylene homopolymer and a dispersed phase of propylene-ethylene copolymer having MFI of 22 g/10 min, Dispersed phase (RC): 21.1 wt %, Ethylene in dispersed phase (RCC2): 52.1 wt %, Ethylene in heterophasic propylene copolymer (T2): 17.5 wt % |
| Glass fiber 1 | Glass fibers with average diameter of 13 μm and average length of 4.5 mm |
| Glass fiber 2 | Glass fibers with average diameter 13 μm and average length of 3 mm |
| Adhesion promoter | polypropylene grafted with maleic anhydride (Exxelor ® PO1020) |
| Flame retardant 1 | 10-15% Ammonium polyphosphate, 60-70% Melamine phosphate, 15-20% phosphoric acid compound (not melamine phosphate), and 3-8% zinc oxide.) |
| Flame retardant 2 | Bisphenol A bis(diphenyl phosphate) |
| Flame retardant 3 | ADK STAB FP2200 |
| Antioxidant 1 | AO1010 |
| Antioxidant 2 | AO168 |
| Antistatic agent | Glyceryl Monostearate |
| Nucleating agent | Sodium benzoate |
| Light stabilizer | UV-770 |
| Anti-drip agent | Teflon (PTFE) encapsulated by Styrene-Ancrylonitrile copolymer |

Polypropylene was pre-mixed with additives and the mixture was extruded using a twin-screw extruder to obtain pellets. The pellets were dried at 100° C. for 3 h and injection molded using FANUC injection molding machine (S-2000i) to prepare test specimens.

The MFI of the composition was measured according to ISO1133-1:2011 (2.16 kg/230° C.).

The flame retardancy was measured according to the UL94 test standard at a sample thickness of 3 mm, 1.5 mm and 0.8 mm. The samples were conditioned at 23° C. and 50% relative humidity for 48 hours prior to testing or at 70° C. and 50% relative humidity for 168 hours. The sample bars were burnt at the gated end for Vx evaluation.

Charpy impact strength was measured according to ISO 179-1:2010 at 23° C. by Toyoseiki Digital Impact DG-UB equipped with a pendulum of 2 J (test geometry: 80*10*4 mm).

Flexural modulus was measured according to ISO 178: 2010 (parallel; test geometry: 80*10*4 mm).

Tensile tests were carried out at room temperature according to ISO 527-1:2012.

Results are summarized in Tables 2 and 3. In Table 2, the propylene-based polymer is a propylene homopolymer and the glass fiber is a long glass fiber. In Table 3, the propylene-based polymer is a mixture of a propylene homopolymer and a heterophasic propylene copolymer and the glass fiber is a short glass fiber.

TABLE 2

| | Unit | CE1 | Ex2 | CE3 | CE4 | Ex5 | Ex6 | Ex7 | CE5 |
|---|---|---|---|---|---|---|---|---|---|
| Polypropylene 1 | wt % | 60.77 | 60.77 | 79.27 | 78.6 | 68.77 | 58.77 | 48.77 | 47.6 |
| Glass fiber 1 | wt % | 20 | 20 | | | 10 | 20 | 30 | 30 |
| Adhesion promoter | wt % | 1.5 | 1.5 | | | 1.5 | 1.5 | 1.5 | 2.0 |
| Flame retardant 1 | wt % | 17 | 15 | 20 | 17 | 17 | 17 | 17 | |
| Flame retardant 2 | wt % | | 2 | | 2 | 2 | 2 | 2 | |
| Flame retardant 3 | | | | | | | | | 20 |
| Antioxidant 1 | wt % | 0.06 | 0.06 | 0.06 | 0.05 | 0.06 | 0.06 | 0.06 | 0.2 |
| Antioxidant 2 | wt % | 0.06 | 0.06 | 0.06 | 0.05 | 0.06 | 0.06 | 0.06 | 0.2 |
| Antistatic agent | wt % | 0.25 | 0.25 | 0.25 | | 0.25 | 0.25 | 0.25 | |
| Nucleating agent | wt % | 0.06 | 0.06 | 0.06 | | 0.06 | 0.06 | 0.06 | |
| Light stabilizer | wt % | 0.3 | 0.3 | 0.3 | | 0.3 | 0.3 | 0.3 | |
| Anti-drip agent | wt % | | | | 0.3 | | | | |

TABLE 2-continued

|  | Unit | CE1 | Ex2 | CE3 | CE4 | Ex5 | Ex6 | Ex7 | CE5 |
|---|---|---|---|---|---|---|---|---|---|
| MFR | g/10 min | 15.47 | 17.19 | 30.63 | 27.02 | 21.647 | 16.509 | 11.507 | 7.92 |
| FR (3 mm) 23° C., 48 h |  | V0 | V0 | V0 | V0 | V0 | V0 | V0 |  |
| FR (3 mm) 70° C., 168 h |  | V0 | V0 | V0 | V0 | V0 | V0 | V0 |  |
| FR (1.5 mm) 23° C., 48 h |  | V2 | V1 | V2 | V1 | V0 | V0 | V0 | V0 |
| FR (1.5 mm) 70° C., 168 h |  | V2 | V1 | V2 | V1 | V0 | V0 | V0 | V0 |
| FR (0.8 mm) 23° C., 48 h |  |  |  |  | Fail |  |  |  |  |
| FR (0.8 mm) 70° C., 168 h |  |  |  |  | Fail |  |  |  |  |
| Charpy Impact @ 23 C (notched) | KJ/m2 | 7.3 | 7.6 | 1.5 | 1.31 | 4.7 | 7.2 | 8.9 | 9.0 |
| Flexural modulus | Mpa | 5192.6 | 4777.56 | 2121.2 | 2005 | 3275.44 | 5042.46 | 7417 | 7431 |

From the comparison of CE1 versus Ex2 using the same amounts of flame retardant, it can be understood that the use of the combination of FR1 and FR2 (Ex2) results in a better flame retardancy than the use of only FR1 (CE1) in glass fiber filled composition.

From the comparison of CE3 and CE4, it can be understood that the use of the combination of FR1 and FR2 (CE4) results in a better flame retardancy than the use of only FR1 (CE3) also in non-glass fiber filled composition. However, from the comparison of CE4 versus Ex5, Ex6 and Ex7 wherein the amount of glass fibers is changed, it can be understood that the presence of the glass fibers results in a better flame retardancy. Thus, the use of the combination of FR1 and FR2 in a glass fiber filled composition achieves a very good flame retardancy.

From the comparison of CE5 with Ex. 7, it can be seen that Ex. 7 balances a higher melt flow (as compared to CE5) with a good impact, flexural modulus and flame retardancy.

TABLE 3

|  | Unit | Ex8 | Ex9 | Ex10 | Ex11 | Ex12 |
|---|---|---|---|---|---|---|
| Polypropylene 1 | wt % | 48.57 | 47.82 | 47.07 | 35.2 | 35.2 |
| Polypropylene 2 | wt % | 5.5 | 4.75 | 4 |  |  |
| Polypropylene 3 | wt % |  |  |  | 31.87 | 26.87 |
| Glass fiber 2 | wt % | 20 | 20 | 20 | 10 | 15 |
| Adhesion promoter | wt % | 1.5 | 1.5 | 1.5 |  |  |
| Flame retardant 1 | wt % | 21 | 22.5 | 24 | 19 | 19 |
| Flame retardant 2 | wt % | 3 | 3 | 3 | 3.5 | 3.5 |
| Antioxidant 1 | wt % | 0.06 | 0.06 | 0.06 | 0.06 | 0.06 |
| Antioxidant 2 | wt % | 0.06 | 0.06 | 0.06 | 0.06 | 0.06 |
| Antistatic agent | wt % | 0.25 | 0.25 | 0.25 | 0.25 | 0.25 |
| Nucleating agent | wt % | 0.06 | 0.06 | 0.06 | 0.06 | 0.06 |
| MFR | g/10 min | 17.39 | 16.33 | 15.66 | 19.55 | 16.02 |
| FR (3 mm) 23° C., 48 h |  |  |  |  | V0 | V0 |
| FR (3 mm) 70° C., 168 h |  |  |  |  | V0 | V0 |
| FR(1.5 mm) 23° C., 48 h |  | V0 | V0 | V0 | V1 | V0 |
| FR(1.5 mm) 70° C., 168 h |  | V0 | V0 | V0 | V1 | V0 |
| FR (0.8 mm) 23° C., 48 h |  | V2 | V0 | V0 |  |  |
| FR (0.8 mm) 70° C., 168 h |  | V2 | V0 | V0 |  |  |
| Charpy Impact @ 23 C (notched) | KJ/m2 | 7.7 | 7.6 | 7.7 | 4.39 | 4.37 |
| Charpy Impact @ 23 C (unnotched) | KJ/m2 | 41.8 | 40.3 | 35.2 | 15.28 | 12.68 |
| Tensile modulus | Mpa | 5725.2 | 5851 | 5909.7 | 2738.84 | 3533.3 |
| Tensile strength @ break | Mpa | 71.4 | 70.7 | 70.2 | 29.97 | 33.608 |
| Tensile elongation | % | 2.58 | 2.52 | 2.57 | 1.86 | 1.599 |

From the comparison of Ex8-10, it can be understood that the higher amount of FR1 in combination with FR 1B results in a better flame retardancy.

From the comparison of Ex 11 and Ex12, it can be understood that the higher amount of glass fiber results in a better flame retardancy.

The invention claimed is:

1. A glass fiber filled flame retardant polypropylene composition comprising
   (A) a propylene-based polymer,
   (B) a first flame retardant in an amount of 15 to 40 wt % of the total composition,
      wherein the first flame retardant is in the form of particles comprising
      ammonium polyphosphate in an amount of 5-15 wt %,
      melamine phosphate in an amount of 50-80 wt %,
      piperazine phosphate in an amount of 10-25 wt %, and
      zinc oxide in an amount of 1-10 wt %,
   each based on a total weight of the first flame retardant;
   (C) a second flame retardant in an amount of 0.1 to 15 wt % of the total composition, wherein the second flame retardant comprises an aromatic phosphate ester; and
   (D) glass fibers in an amount of 5 to 40 wt % of the total composition.

2. The composition according to claim 1, wherein the polypropylene-based polymer comprises a propylene homopolymer or a propylene-α-olefin copolymer consisting of at least 70 wt % of propylene and up to 30 wt % of α-olefin based on the total weight of the copolymer, wherein the α-olefin is selected from the group of α-olefins having 2 or 4-10 carbon atoms.

3. The composition according to claim 1, wherein the polypropylene-based polymer comprises a heterophasic propylene copolymer consisting of
   (a) a propylene-based matrix,
      wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
      wherein the propylene-based matrix is present in an amount of 60 to 95 wt % based on the total heterophasic propylene copolymer and
   (b) a dispersed ethylene-α-olefin copolymer,
      wherein the dispersed ethylene-α-olefin copolymer is present in an amount of 40 to 5 wt % based on the total heterophasic propylene copolymer and
      wherein the sum of the total amount of propylene-based matrix and total amount of the dispersed ethylene-α-olefin copolymer in the heterophasic propylene copolymer is 100 wt %.

4. The composition of claim 1, wherein the first flame retardant has a normal particle size distribution (D50) of at least 8 microns as determined by Mastersizer 2000 available from Malvern.

5. The composition of claim 1, wherein the amount of phosphate in the first flame retardant is 40-75 wt % as measured after treating with nitric acid using ICP-OES spectrometer (iCAP 6300 Duo available from Thermo Fisher).

6. The composition of claim 1, wherein the aromatic phosphate ester is selected from the group consisting of
   resorcinol bis(diphenyl phosphate);
   tetraphenyl resorcinol bis(diphenylphosphate);
   bisphenol A bis(diphenyl phosphate);
   bisphenol A diphosphate;
   resorcinol bis(di-2,6-xylyl phosphate);
   phosphoric acid, mixed esters with [1,1'-biphenyl]-4,4'-diol and phenol;
   phosphoric trichloride, polymer with 1,3-benzenediol, phenyl ester;
   1,3-phenylene-tetrakis(2,6-dimethylphenyl)diphosphate;
   isopropenylphenyl diphenyl phosphate;
   4-phenylphenolformaldehyde phenylphosphonate;
   tris(2,6-xylyl)phosphate;
   bisphenol S bis(diphenyl phosphate); and
   resorcinol-bisphenol A phenyl phosphates.

7. The composition of claim 1, wherein the amount of (A) is 50 to 79.9 wt %, with respect to the total composition.

8. The composition of claim 1, wherein the total amount of (A), (B), (C) and (D) is at least 90 wt % of the total composition.

9. The composition of claim 1, wherein the composition has a notched Charpy impact strength according to ISO 179-1:2010 at 23° C. (test geometry: 80*10*4 mm) of at least 4.0 KJ/m².

10. A process for the preparation of the composition according to claim 1, comprising melt mixing (A), (B), (C) and (D).

11. An article comprising the composition of claim 1.

12. The article of claim 11, wherein the article is selected from the group consisting of enclosures of (miniature) circuit breakers, battery carriers and covers in electric cars, caps and closures, pails, containers, external and internal parts in appliances, stadium seats, automotive exterior parts, and automotive interior parts.

\* \* \* \* \*